United States Patent [19]

Frakes

[11] Patent Number: 4,478,380
[45] Date of Patent: Oct. 23, 1984

[54] WING TIP VORTICES SUPPRESSOR

[76] Inventor: James F. Frakes, P.O. Box 1025, Keene, Tex. 76059

[21] Appl. No.: 446,456

[22] Filed: Dec. 3, 1982

[51] Int. Cl.³ .................... B64C 21/02; B64C 23/00
[52] U.S. Cl. ................................. 244/199; 244/91
[58] Field of Search ............ 244/53 B, 91, 198, 199, 244/204, 210, 130; 416/22, 90 R, 90 A, 91

[56] References Cited

U.S. PATENT DOCUMENTS

| 2,041,793 | 5/1936 | Stalker | 244/199 |
| 2,163,655 | 6/1939 | Zimmerman | 244/199 |
| 3,974,986 | 8/1976 | Johnstone | 244/130 |
| 4,382,569 | 5/1983 | Bieppe et al. | 244/199 |

FOREIGN PATENT DOCUMENTS

| 52242 | 5/1982 | European Pat. Off. | 198/ |
| 729821 | 8/1932 | France | 244/198 |
| 1564026 | 4/1969 | France | 244/199 |
| 368067 | 2/1939 | Italy | 244/199 |

OTHER PUBLICATIONS

"Gulfstreamer", vol. 5, No. 6, Winter 1976.

Primary Examiner—Trygve M. Blix
Assistant Examiner—Rodney Corl
Attorney, Agent, or Firm—Robert A. Felsman

[57] ABSTRACT

A wing tip vortices suppressor utilizing a scoop having an inlet at the lower, leading surface of the wing and an outlet at the upper, trailing surface to reduce turbulence causing pressure differential across the wing. A turbulence fence is used at the tip to account for the frictional losses of the air flowing through the scoop and other phenomena that prevent exact pressure equilization.

4 Claims, 6 Drawing Figures

WING TIP VORTICES SUPPRESSOR

BACKGROUND OF THE INVENTION

1. Field of the Invention

This invention relates in general to improvements to aircraft, particularly to improvements that reduce or suppress the vortices which trail from wing tips during flight.

2. Description of the Prior Art

Vortices are formed in the wake of airplanes during flight, including those vortices generated at the wing tips. When conditions are favorable, wing tip vortices are visible and susceptible to the collection of empirical data useful in analysis that may lead to correctional modifications.

An example of data collection following visulization may be seen in a report prepared by Ernest J. Cross, Jr., Phillip D. Bridges, Joe A. Brownlee and W. Wayne Livingston, "Full Scale Visualization of the Winged Tip Vortices Generated By A Typical Agricultural Aricraft", NASA Contract Report 159382, November 1980.

This report shows one form of a typical attempt to reduce or suppress wing tip vortices, the wing tip fence. The fence extends transversely in a vertical or oblique direction from the extremity of the wing tip. Various configurations have been proposed and are said to have beneficial effect, which has led to commercialization of at least one form, as indicated in FIG. 7 of the above NASA report. But the problem remains.

The problem manifests itself in several troublesome ways. Danger awaits the unwary in the trailing path of large, high speed jets. So severe is the turbulence and danger that small aircraft should not close within miles of the trailing path of a Boeing 747. Wing tip turbulence from agricultural aircraft disperses chemicals laterally beyond the intended path, sometimes with damaging consequences.

SUMMARY OF THE INVENTION

The general object of the invention is to provide an improvement to suppress wing tip vortices.

The object of the invention is achieved by the use of a scoop which passes through the wing, near its tip, to reduce the pressure differential between the lower and the upper surfaces of the wing.

In a preferred form the scoop is of the type referred to as the NACA Scoop, which is well known for its low drag characteristics and used for other purposes on aircraft. The inlet of the scoop is located on the lower surface of the wing near the leading edge, while the outlet is located on the upper surface near the trailing edge. The high pressure air from the lower surface of the wing is fed to the outlet on the upper surface to reduce the pressure differential at the trailing edge of the wing tip. Reduction of the pressure differential reduces the wing tip vortex.

To further suppress the vortex, a wing tip fence is also employed. The preferred form of fence has a forward region descending from the lower surface of the tip and a rearward region that ascends from the tip ahead of the trailing edge. Both regions have surfaces shaped like foils to produce streamlined flow.

The above as well as other objects, features and advantages of the invention will be seen in the following description.

DESCRIPTION OF THE PREFERRED EMBODIMENT

Figure 1:
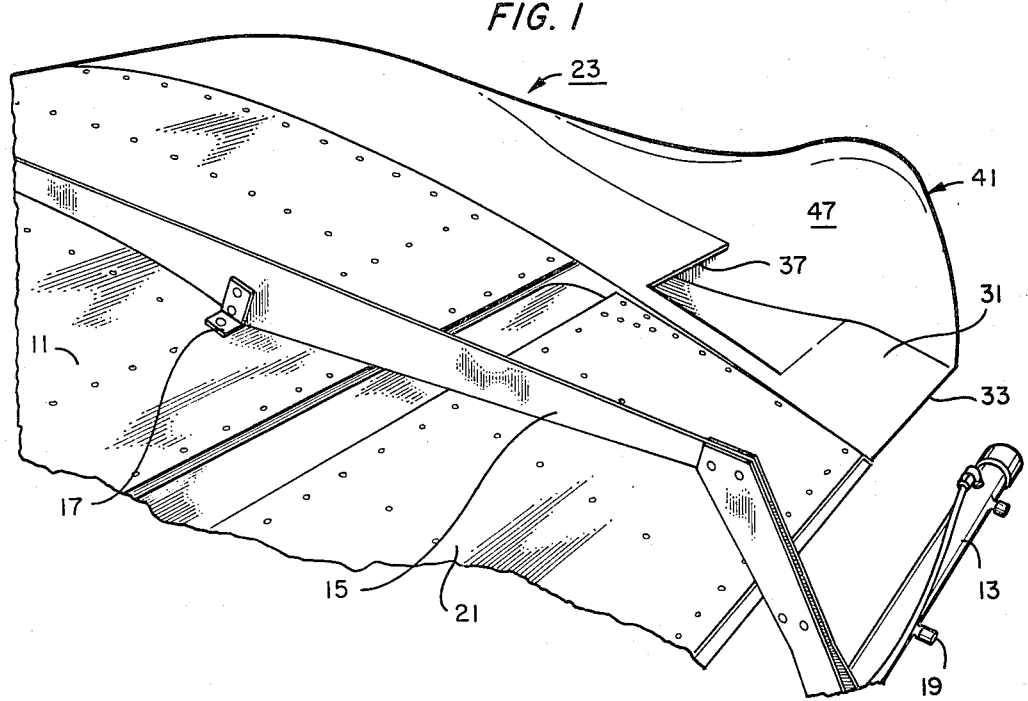
FIG. 1 is a perspective view of a wing, broken away to show only the tip region as modified to include the invention.

The numeral 11 in the drawings designates the end portion of a wing, which in this instance includes an agricultural spray boom 13. A suitable mounting bracket 15 is secured with fasteners 17 to the wing and nozzles 19 are adapted to spray selected chemicals aft of the wing. An aileron 21 of conventional configuration is secured to the wing.

Figure 2:
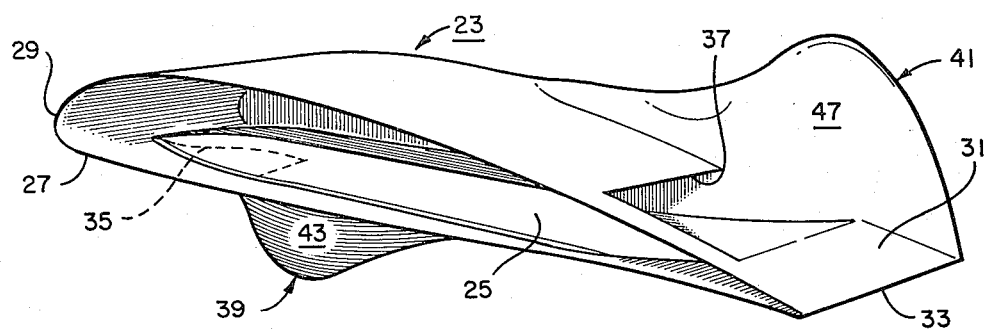
FIG. 2 is a perspective view of the same wing tip region shown in FIG. 1, cross sectioned in this instance to show the configuration of the NACA scoop which extends through the wing.
Figure 3:
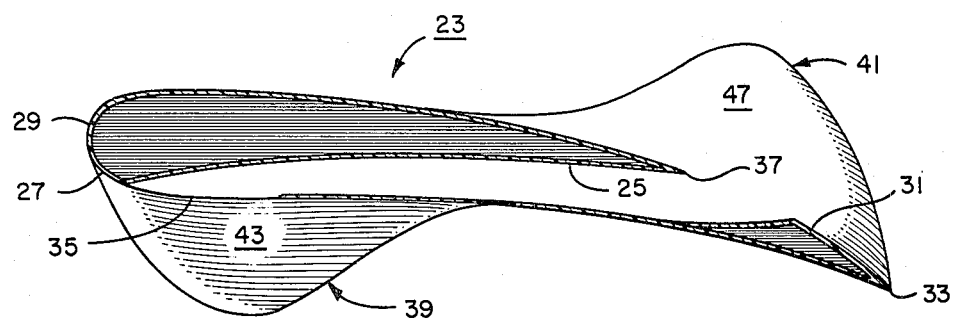
FIG. 3 is a transverse cross sectional view showing the wing tip region as viewed when looking outward toward the tip. The configurations of the forward and rearward turbulence fences, as viewed from one side, are apparent in this view.
Figure 4:
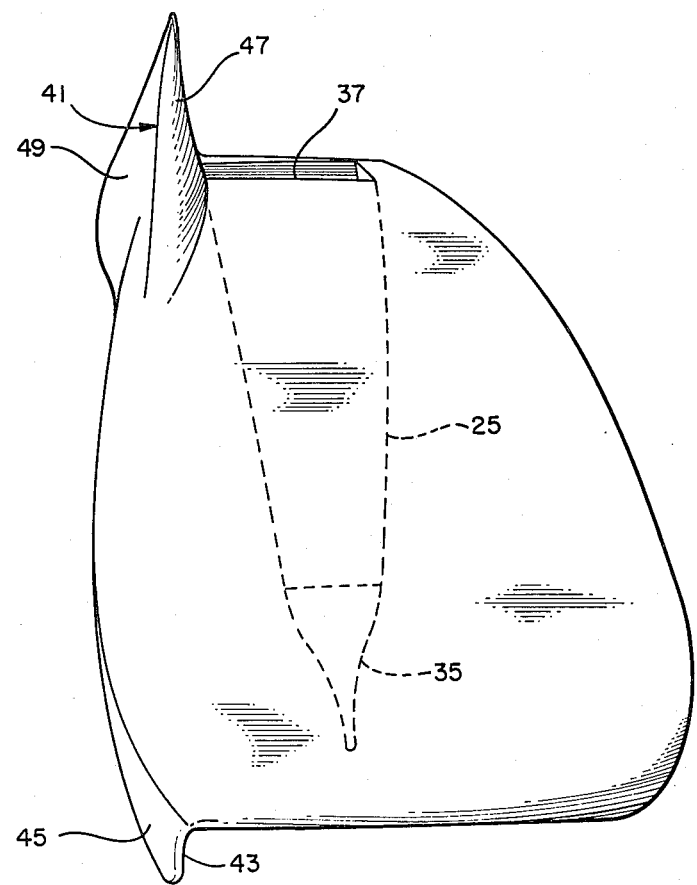
FIG. 4 is a top view of a wing, broken away to show only the tip region, modified to include the invention.
Figure 5:
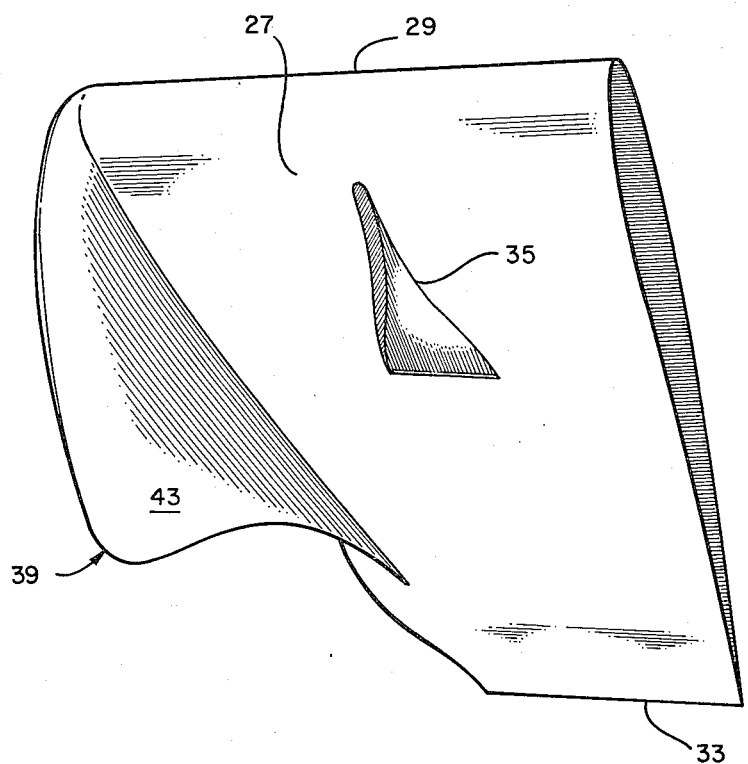
FIG. 5 is a perspective view of an outer section of the wing tip as seen looking upwardly and outwardly from a position below the wing tip to show the inlet configuration of the NACA scoop and the shape of the forward region of the turbulence fence.

The tip 23 is modified to include the invention, which has a scoop 25 (see especially FIGS. 2, 3 and 4) that extends from a lower, leading surface 27 near the leading edge 29 through the upper trailing surface 31 adjacent the trailing edge 33. The inlet 35, the outlet 37 and the overall configuration of the scoop 25 are obtained from NASA (The National Aeronautics and Space Administration) design criteria and is referred generally and herein as the "NACA Scoop".

Further, there is a turbulence fence at the extremity of the wing tip, outboard of the scoop. The fence has a lower, forward region 39 and an upper, rearward region 41.

The forward region 39 and rearward region 41 of the fence have configurations resulting from flight tests with tufted wing tips to reach laminar flow conditions. The most successful configurations are those shown.

Figure 6:
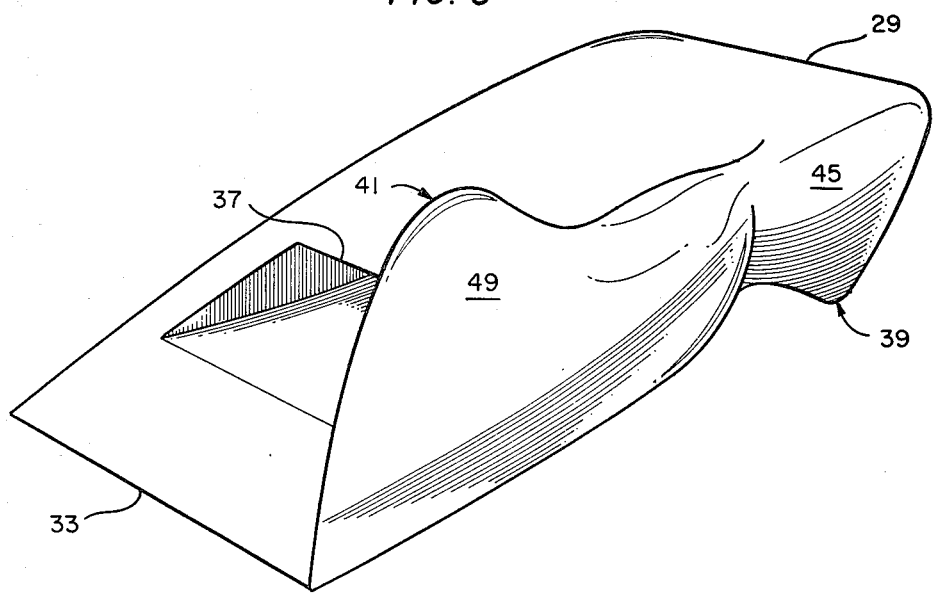
FIG. 6 is a perspective view of the outer section of the wing tip as seen looking downwardly and inwardly to show the outlet configuration of the NACA scoop, the forward and rearward regions of the turbulence fence, and the air foil configurations of the outer surfaces of the fence.

The forward, lower region 39 has a stabilizer shape with an inner surface 43 (see FIGS. 4 and 6) in the form of a foil. The inner surface 43 is essentially flat, although a slight foil configuration may assist in preventing turbulence near the inlet 35 of the scoop, while outer surface 45 is in the form of a foil. Rearward, upper region 41 has an inner, foil surface 47 and an outer, foil surface 49, both inducive to laminar flow.

In flight the wing tip configuration described above, tufted to enable turbulence visualization, evolved from repeated tests. Essentially laminar flow was achieved at various velocities, indicating successful supression of wing tip generated vortices. The scoop 25 transfers high pressure air from lower, leading surface 27 to the outlet 37 in the upper, trailing surface 31. This reduces the pressure differential across the trailing edge of the wing tip and suppresses the formation of vortices.

The turbulence fence with its forward and rearward regions 39, 41 confines air flow to prevent spillage over the wing tip to enhance the efficiency of the scoop and its intended pressure equalization. The fence is beneficial since pressure losses of the air flowing through the scoop prevent exact pressure equilization of the air above the tip and that below the tip near the trailing edge. Thus, the combination of the scoop with the turbulence fence is especially effective.

While the invention has been shown in only one form and applied to an agricultural aircraft, it is not to be limited to this form but is susceptible to various modifications within the spirit thereof.

I claim:

1. A wing tip vortices suppressor which comprises:
   a scoop passing through the wing, with an inlet and an outlet located near the wing tip;
   the inlet being located in the lower surface of the wing, adjacent the leading edge, to entrain high pressure air during flight;
   the outlet being located in the upper surface of the wing, adjacent the trailing edge, to discharge air from the inlet;
   a wing tip fence positioned outboard said inlet and outlet;
   the fence and the scoop cooperating to suppress the vortices and reduce the pressure differential at the trailing edge of the wing tip.

2. A wing tip vortices suppressor which comprises:
   a NACA low drag scoop passing through the wing, having an inlet and an outlet located near the wing tip;
   the inlet being located in the lower surface of the wing, adjacent the leading edge, to entrain high pressure air during flight;
   the outlet being located in the upper surface of the wing, adjacent the trailing edge, to discharge air from the inlet;
   a wing tip fence positioned outboard of said inlet and outlet;
   the fence and the scoop cooperating to suppress the vortices and reduce the pressure differential at the trailing edge of the wing tip.

3. The invention defined by claim 2 wherein the wing tip fence has a forward region that descends from the lower surface and a rearward region that ascends from the wing ahead of the trailing edge.

4. A wing tip vortices suppressor which comprises:
   a NACA low drag scoop passing through the wing, having an inlet and an outlet located near the wing tip;
   the inlet being located in the lower surface of the wing, adjacent the leading edge, to entrain high pressure air during flight;
   the outlet being located in the upper surface of the wing, adjacent the trailing edge, to discharge air from the inlet;
   a wing tip fence positioned outboard of said inlet and outlet, having a forward region that descends from the lower surface of the wing and a rearward region that ascends from the wing, both the forward and rearward regions having surfaces in the form of a foil that join in a mid-section of the wing tip;
   the fence and the scoop cooperating to suppress the vortices and reduce the pressure differential at the trailing edge of the wing tip.

* * * * *